Dec. 30, 1969    A. J. PETERSEN    3,486,997

REFERENCE ELECTRODE

Filed Dec. 22, 1966

ARNE J. PETERSEN
INVENTOR.

BY *Thomas L. Peterson*

ATTORNEY

United States Patent Office

3,486,997
Patented Dec. 30, 1969

3,486,997
REFERENCE ELECTRODE
Arne J. Petersen, Balboa, Calif., assignor to Beckman Instruments, Inc., a corporation of California
Filed Dec. 22, 1966, Ser. No. 603,908
Int. Cl. B01k 1/00, 3/00
U.S. Cl. 204—195
9 Claims

ABSTRACT OF THE DISCLOSURE

A liquid junction structure for an electrochemical reference electrode comprising a valve body positioned within a tube which terminates in an inwardly extending flange providing a central opening in the end of the tube. The valve body includes an enlarged portion positioned inside and freely movable within the tube adjacent to the flange and a smaller portion protruding through the opening and extending beyond the end of the tube. The body is biased into contact with the inner surface of the flange to provide a minute passageway therebetween. By pressing against the protruding portion of the valve body, the body may be readily moved inwardly to permit salt bridge solution to move rapidly through the liquid junction thereby flushing out any viscous material clogging the junction.

---

Figure 1:
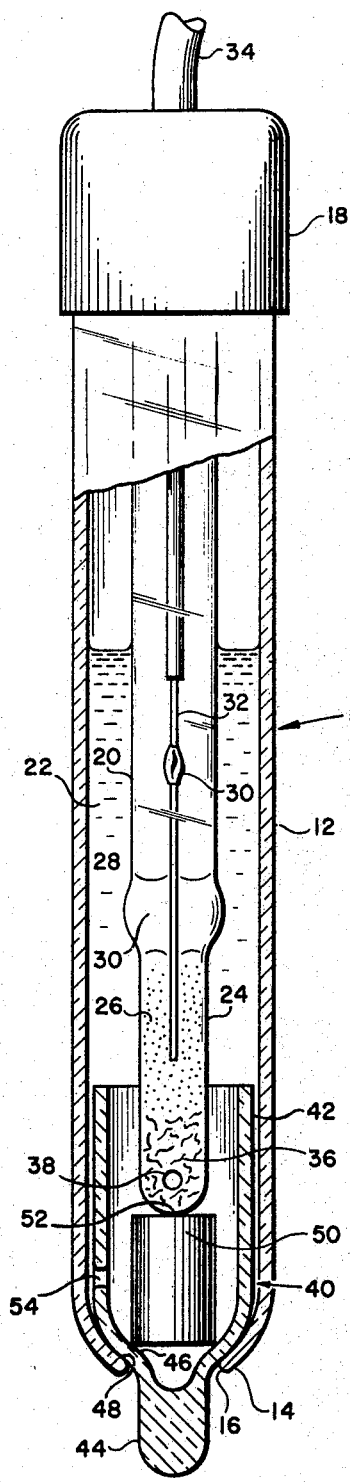

This invention relates generally to an electrochemical reference electrode and, more particularly, to a liquid junction structure for a reference electrode utilized for ion potential measurements of solutions.

In electrochemical measurements a reference electrode is commonly employed in conjunction with a measuring electrode, such as a glass electrode, with both electrodes immersed in a solution, whereby the potential difference between the two electrodes is a function of the concentration of a specific ion in the solution. A typical example is the conventional pH meter used for measuring hydrogen ion concentrations of solutions.

A reference electrode ordinarily comprises an internal half cell structure supported within a tube containing a salt solution, the tube of salt solution being known as a salt bridge. Electrical connection between the salt solution and the sample or test solution is made by liquid contact via a suitably formed aperture or passage in the tube, generally referred to as a liquid junction structure. Sometimes the entire unit consisting of the internal half cell structure, the tube, the salt solution and the liquid junction structure is referred to as a half cell; however, for the present specification, the entire unit will be referred to as a reference electrode.

In some electrochemical measurements it is necessary to flush the liquid junction structure of the reference electrode due to the structure becoming clogged by slurries or viscous material contained in the sample solution. In the case of those types of reference electrodes which employ porous plugs as the liquid junction structures, the plugs are flushed or cleaned by boiling in a salt solution. However, this process is time consuming and oftentimes does not successfully result in the cleaning of the liquid junction structure. One type of a liquid junction structure which may be readily cleaned is the sleeve type liquid junction structure. In this type of structure, the salt bridge tube of the reference electrode is tapered down towards its end and is ground to provide a roughened surface. An opening in the tapered portion permits salt bridge solution to flow to the outside of the tube. A sleeve tapered to conform to the tapered portion of the salt bridge tube is slipped over the end of the tube so as to define between the sleeve and the tapered end a minute passage for flow of salt bridge solution to the sample solution. The sleeve may be removed from the tapered end to flush the liquid junction provided therebetween. However, this type of electrode has the disadvantage that the tapered sleeve oftentimes falls off the salt bridge tube and breaks. On the other hand, if the sleeve is tightly pressed onto the tapered end of the electrode, it is sometimes difficult to remove the sleeve to flush the junction. Another type of readily flushed liquid junction structure for a reference electrode is one in which the salt bridge tube has an elongated tubular extension in which there is positioned a precision ground glass rod providing therebetween a minute cylindrical passage forming the liquid junction. The rod extends beyond the end of the glass extension of the salt bridge tube so that it may be moved inwardly to flush the liquid junction by means of the salt bridge solution flowing through the annular passage. However, this type of a liquid junction structure has the disadvantage that oftentimes the ground glass rod becomes lodged in the glass tube extension and thus cannot be moved to permit flushing of the liquid junction except with the use of substantial force which oftentimes breaks the electrode.

It is, therefore, the principal object of the present invention to provide an improved liquid junction structure for an electrochemical reference electrode which may be readily flushed.

According to the principal aspect of the present invention, there is provided an improved liquid junction structure for an electrochemical reference electrode in which the salt bridge tube of the electrode terminates in an inwardly extending flange providing a central opening in the end of the tube. A valve body is positioned in the tube with an enlarged portion of the body being adjacent to said flange and a smaller portion protruding through the opening and extending beyond the end of the tube. The valve body cooperates with the inner surface of the flange to provide a minute passageway or liquid junction through the end of the tube. Since the liquid junction is formed merely by the contact of two generally annular surfaces, namely, the surface of the enlarged portion of the valve body and the flange, the valve body may be readily moved inwardly by exerting pressure to the protruding portion of the body to permit salt bridge solution to move rapidly through the liquid junction thereby flushing out any slurries or viscous material clogging the junction. This is in contrast to the above-described prior art liquid junction structures in which the junctions are formed between elongated cylindrical surfaces of mating glass parts which oftentimes cannot be separated for flushing the junctions without damaging the electrodes. Also, the liquid junction of the invention is less expensive to manufacture since a precision bore tubing and rod are not required.

Figure 2:
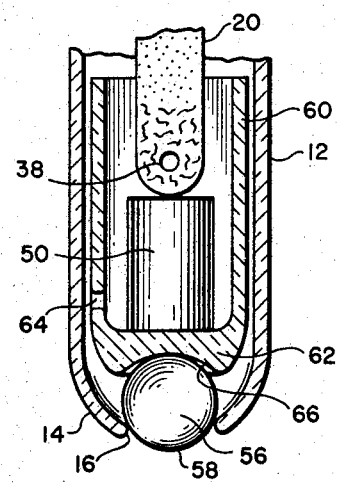

Other objects, aspects and advantages will become apparent from the following description taken in connection with the accompanying drawing wherein:

FIG. 1 is a partial longitudinal sectional view of a preferred form of a reference electrode of the invention; and FIG. 2 is a longitudinal sectional view of the lower portion of a modified form of the reference electrode of the invention.

Referring now to the drawing in detail, wherein like reference characters designate like parts in the two views, there is shown in FIG. 1 the preferred form of the reference electrode of the invention, generally designated by numeral 10. The reference electrode 10 comprises a glass tube 12 having an inwardly extending flange 14 at the lower end providing an opening 16 with its upper end closed by a cap 18. An internal half cell 20 is supported coaxially within the tube 12 and is immersed in a salt bridge solution 22 within the tube, generally saturated potassium chloride.

The internal half cell 20 comprises a glass tube 24 containing in its lower portion a mixture of mercury and calomel 26. A platinum wire 28 is sealed by means of a glass ring seal 30 within the tube 24 with its lower end embedded in the mercury-calomel mixture 26 while its upper end is connected by means of a solder connection 30 to an insulated conductor 32. The conductor 32 passes through a cable 34 extending from the cap 18 for connection to a pH meter, not shown. A layer of glass wool 36 is provided in the lower portion of the tube 24 for supporting the mixture 26 and a small hole 38 in the lower wall of the tube provides a liquid junction between the half cell and the electrolyte 22. While the internal half cell has been described as being of the mercury-calomel type, it is understood that other types of internal half cells could be employed as, for example, a silver-silver chloride half cell.

The liquid junction structure of the invention is provided by a valve body 40 positioned in the lower end of the salt bridge tube 12. The body 40, which is preferably formed of glass, comprises a tubular element 42 which is coaxial with the longitudinal axis of the tube 12 with its upper portion surrounding the lower end of the internal half cell 20. As seen in FIG. 1, the tubular element 42 has a diameter greater than that of the opening 16 in the end of the tube 12 yet sufficiently small so that the outer surface of the element is spaced, as seen in FIG. 1, from the inner wall of the tube 12 and, hence, the body 40 is freely movable within the tube. The element 42 narrows down to a reduced diameter portion 44 which protrudes through the opening 16. An annular shoulder 46 is thereby provided between the tubular element 42 and the protruding portion 44. The shoulder 46 bears against the inside surface 48 of the flange 14 thereby providing an annular area of contact between the two parts and a minute passageway at such point of contact which permits a very slow flow of salt bridge solution 22 to the sample solution. It can be readily appreciated that by merely exerting a force against the end of the protruding portion 44 in an upward direction, the valve body 40 will be lifted off of the flange 14 thereby permitting a fast flow of salt solution through the space between the two parts thereby permitting a rapid and complete flushing of any materials clogging the liquid junction.

It can be appreciated that because there is merely an annular surface contact between the valve body 40 and the flange 14, the valve body may be readily lifted by pressing against the end of the protruding portion 14 which is in contrast to prior art flushable liquid junction structures for reference electrodes in which there are cylindrical mating glass parts which become wedged or lodged together and are extremely difficult to separate without damaging the electrodes.

In order to ensure that the valve body 40 is maintained in contact against the flange 14 and to prevent movement of the valve body inwardly against the glass tube 24 when the reference electrode is inverted, there is provided an elastomeric plug 50 with its lower end bearing against the annular shoulder 46 of the valve body 40 and its upper end bearing against the end 52 of the internal half cell. The plug 50 is preferably formed of silicone rubber and positioned between the valve body 40 and end of the half cell 20 under slight compression to maintain the valve body biased towards the flange 14 at the end of the salt bridge tube 12.

An opening 54 is provided in the lower portion of the tubular element 42 in order to provide electrolytic communication between the opening 16 of the reference electrode and the hole 38 in the internal half cell when the level of the salt bridge solution 22 drops below the top of the valve body 40.

Reference is now made to FIG. 2 which illustrates a modified form of the liquid junction structure of the invention. In this embodiment of the invention, the valve body is in the form of a glass ball 56 having a diameter greater than that of the opening 16 in the end of the salt bridge tube 12 so that the major portion of the ball is positioned behind the flange 14 while a small portion of the ball 58 protrudes through the opening 16 and beyond the end of the tube 12.

A cylindrical glass member 60 is coaxially positioned within the lower portion of the tube 12 having a closed end 62 bearing against the upper surface of the ball 56. The lower portion of the internal half cell extends into the cylindrical member 60 and an elastomeric plug 50 is positioned between the end of the half cell and the closed end 62 of the cylindrical member 60 in the same fashion as described in connection with FIG. 1 above so as to bias the member 60 and ball 56 toward the flange 14 of the electrode. An opening 64 is provided in the lower portion of the member 60 in order to ensure electrolytic communication between the hole 38 in the internal half cell and the opening 16 of the salt bridge tube when the level of the salt bridge solution is below the top of the member 60.

Preferably the lower surface 66 of the end 62 of the cylindrical member 60 is curved to mate with the cylindrical surface of the ball 56 so as to facilitate the rotation of the ball in the assembly. In order to flush the liquid junction provided between the ball 56 and the flange 14, the protruding portion 58 of the ball may be pressed inwardly or moved along a flat surface to rotate the ball in a fashion similar to a ballpoint pen.

While the reference electrode of the invention has been described above as employing glass parts, it is understood that other nonconductive materials may be utilized, such as plastic.

Although only two embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. An electrochemical reference electrode comprising:
   a tube of nonconductive material, an inwardly extending flange on said tube adjacent to one end thereof providing a central opening;
   an internal half cell supported in said tube for contacting a salt bridge solution in the tube;
   a valve body having a first portiton of a diameter greater than that of said opening and positioned inside said tube adjacent to said flange, the outer surface of said first portion being spaced from the inner wall of said tube;
   said valve body having a second portion protruding through said opening and extending beyond said one end of said tube, said second portion having a cross sectional area less than that of said opening whereby said valve body may be moved inwardly into said tube by exerting pressure to the end of said second portion thereof;
   a third portion of said valve body between said first and second portions contacting the inner surface of said flange and providing therebetween a minute passageway through said one end of said tube;
   said valve boy being freely movable within said tube; and
   compressible means in said tube biasing said third portion of said valve body against said inner surface of said flange.

2. An electrochemical reference electrode as set forth in claim 1 wherein said biasing means is an elastomeric plug positioned between said valve body and said internal half cell.

3. An electrochemical reference electrode as set forth in claim 1 wherein said first portion of said valve body is a tubular element coaxial with the longitudinal axis of said tube, said tubular element narrowing down to a reduced diameter generally cylindrical section forming said second portion of said valve body and said third portion of said valve body comprising a generally annular shoulder between said tubular element and said reduced diameter section.

4. An electrochemical reference electrode as set forth in claim 3 wherein said internal half cell is supported coaxially in said tube with an end thereof extending into said tubular element; and said biasing means comprises an elastomeric plug in said tubular element with one end bearing against the end of said internal half cell in said tubular element and the other end bearing against said annular shoulder.

5. An electrochemical reference electrode as set forth in claim 4 including an opening in said tubular element adjacent to said annular shoulder.

6. An electrochemical reference electrode as set forth in claim 1 wherein said valve body comprises a ball having a diameter greater than that of said opening with a portion of said ball extending through said opening forming said second portion of said valve body.

7. An electrochemical reference electrode as set forth in claim 6 wherein said biasing means is positioned between said internal half cell and said ball.

8. An electrochemical reference electrode as set forth in claim 6 wherein said internal half cell is supported coaxially in said tube;

a cylindrical member is mounted coaxially within said tube having an open end and a closed end bearing against said ball with an end of said internal half cell extending into said cylindrical member through said open end; and said biasing means comprises an elastomeric plug positioned in said cylindrical member having one end bearing against said end of said internal half cell and the other end bearing against the closed end of said cylindrical member.

9. An electrochemical reference electrode as set forth in claim 8 wherein said closed end of said cylindrical member has a curved surface substantially mating with the surface of said ball to facilitate rotating movement of said ball and positioning of said ball against said flange.

References Cited

UNITED STATES PATENTS

| | | | |
|---|---|---|---|
| 1,599,483 | 9/1926 | Parker | 204—195 |
| 2,058,761 | 10/1936 | Beckman et al. | 204—195.1 |
| 2,186,727 | 1/1940 | Martin et al. | 204—195.1 |

FOREIGN PATENTS 678,648  9/1952  Great Britain.

JOHN H. MACK, Primary Examiner

T. TUNG, Assistant Examiner